US011573682B2

(12) United States Patent
Park

(10) Patent No.: US 11,573,682 B2
(45) Date of Patent: Feb. 7, 2023

(54) SYSTEM AND METHOD FOR SELECTING ONE OUT OF A PLURALITY OF PARTICIPANTS IN A NETWORK-BASED VIDEO MEETING

(71) Applicant: salesforce.com, inc., San Francisco, CA (US)

(72) Inventor: Ed Park, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 26 days.

(21) Appl. No.: 17/248,500

(22) Filed: Jan. 27, 2021

(65) Prior Publication Data

US 2022/0236838 A1 Jul. 28, 2022

(51) Int. Cl.
*G06F 3/0482* (2013.01)
*H04L 67/02* (2022.01)
*G06F 3/04817* (2022.01)
*G06F 3/14* (2006.01)
*H04N 7/15* (2006.01)

(52) U.S. Cl.
CPC ........ *G06F 3/0482* (2013.01); *G06F 3/04817* (2013.01); *G06F 3/1454* (2013.01); *H04L 67/02* (2013.01); *H04N 7/15* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |

(Continued)

OTHER PUBLICATIONS

Cisco, "WebEx Meeting Center User Guide," May 22, 2013.*
Game Show Videos, "Press Your Luck—Episode 1," Oct. 19, 2012, https://www.youtube.com/watch?v=uTjXO0LUHdA.*

*Primary Examiner* — Ryan Barrett
(74) *Attorney, Agent, or Firm* — LKGlobal | Lorenz & Kopf, LLP

(57) ABSTRACT

A method is provided for selecting one out of a plurality of participants in a network-based video meeting. The method comprises: sharing, by a computing device of a first participant of the plurality of participants, a screen for viewing by the other participants that provides a participant-specific graphical element associated with each of the plurality of participants; receiving, in a communication application of the first participant, the actuation of a selectable link provided via the communication application; selecting one of the participants responsive to the actuation of the selectable link and providing, on the shared screen, a graphical indicator element that identifies the participant-specific graphical element associated with the selected participant; wherein the shared screen is provided over a network to each participant for viewing the participant-specific graphical elements and the graphical indicator element that identifies the participant-specific graphical element associated with the participant selected during the selection.

20 Claims, 7 Drawing Sheets

(56) References Cited

U.S. PATENT DOCUMENTS

| | | | |
|---|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,768,306 B1* | 7/2014 | Ben Ayed .......... H04W 12/069 455/411 |
| 11,228,625 B1* | 1/2022 | Libin ................. H04L 65/403 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2008/0303949 A1* | 12/2008 | Ciudad .................. H04N 9/74 348/E9.055 |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0066644 A1* | 3/2012 | Mizutani ............ G06F 3/04855 715/810 |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2015/0304366 A1* | 10/2015 | Bader-Natal ........ H04L 12/1813 348/14.03 |
| 2015/0370529 A1* | 12/2015 | Zambetti ............ G06F 3/0482 345/156 |

(56) References Cited

U.S. PATENT DOCUMENTS

| | | | | |
|---|---|---|---|---|
| 2016/0070429 | A1* | 3/2016 | Clark | G06F 3/0482 |
| | | | | 715/784 |
| 2016/0073056 | A1* | 3/2016 | Katzman | G06F 3/04817 |
| | | | | 348/14.07 |
| 2017/0357317 | A1* | 12/2017 | Chaudhri | G06F 3/04883 |
| 2018/0113577 | A1* | 4/2018 | Burns | H04N 21/8456 |
| 2018/0375676 | A1* | 12/2018 | Bader-Natal | G06F 3/0481 |
| 2019/0266450 | A1* | 8/2019 | van Rensburg | G06K 9/6267 |
| 2020/0326824 | A1* | 10/2020 | Alonso | G06F 3/0482 |
| 2021/0400142 | A1* | 12/2021 | Jorasch | H04M 3/567 |
| 2021/0407520 | A1* | 12/2021 | Neckermann | H04L 12/1827 |

* cited by examiner

SYSTEM AND METHOD FOR SELECTING ONE OUT OF A PLURALITY OF PARTICIPANTS IN A NETWORK-BASED VIDEO MEETING

TECHNICAL FIELD

Embodiments of the subject matter described herein relate generally to network-based video meetings, and more particularly to selection methods in network-based video meetings.

BACKGROUND

During video meetings, an awkward silence may result when individuals are asked to volunteer to present information. It would be desirable to provide a way to randomly, semi-randomly, or in an orderly fashion choose participants to present.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a processor-implemented method, implemented using a network communication application, for selecting one out of a plurality of participants in a network-based video meeting is provided. The method includes: receiving, in a network communication application of a first participant, the actuation of a selectable link provided via the communication application; selecting, by a computing device of the first participant, one of the plurality of participants responsive to the actuation of the selectable link; linking a graphical indicator element with a participant-specific graphical element associated with the selected one of the plurality of participants; and causing the graphical indicator element to be displayed on display devices associated with computing devices for the plurality of participants; wherein when the plurality of participants view a gallery view of the participants, the graphical indicator element identifies the participant-specific graphical element associated with the selected participant.

In another embodiment, a processor-implemented system configured for use by a first participant of a plurality of participants in a network-based video meeting and for selecting one of the plurality of participants is provided. The system includes a controller configured by programming instructions on non-transitory computer readable media to: receive actuation of a selectable link provided via the communication application; select one of the plurality of participants responsive to the actuation of the selectable link; link a graphical indicator element with a participant-specific graphical element associated with the selected one of the plurality of participants; and cause the graphical indicator element to be displayed on display devices associated with computing devices for the plurality of participants; wherein when the plurality of participants view a gallery view of the participants, the graphical indicator element identifies the participant-specific graphical element associated with the selected participant.

In another embodiment, a processor-implemented method, implemented using a network communication application, is provided for selecting one out of a plurality of participants in a network-based video meeting. The method includes: sharing, by a computing device of a first participant of the plurality of participants, a screen for viewing by the other participants that provides a participant-specific graphical element associated with each of the plurality of participants; receiving, in the communication application of the first participant, the actuation of a selectable link provided via the communication application; selecting one of the participants responsive to the actuation of the selectable link and providing, on the shared screen, a graphical indicator element that identifies the participant-specific graphical element associated with the participant selected during the selection; wherein the shared screen is provided over a network to each participant for viewing the participant-specific graphical elements and the graphical indicator element that identifies the participant-specific graphical element associated with the participant selected during the selection.

In another embodiment, a processor-implemented system configured for use by a first participant of a plurality of participants in a network-based video meeting and for selecting one of the plurality of participants is provided. The system includes a controller configured by programming instructions on non-transitory computer readable media to: share a screen for viewing by the other participants that provides a participant-specific graphical element associated with each of the plurality of participants; receive the actuation of a selectable link provided via a communication application for facilitating the network-based video meeting; and select one of the participants responsive to the actuation of the selectable link and provide, on the shared screen, a graphical indicator element that identifies the participant-specific graphical element associated with the participant selected during the selection; wherein the shared screen is provided over a network to each participant for viewing the participant-specific graphical elements and the graphical indicator element that identifies the participant-specific graphical element associated with the participant selected during the selection.

Furthermore, other desirable features and characteristics will become apparent from the subsequent detailed description and the appended claims, taken in conjunction with the accompanying drawings and the preceding background.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

Figure 1:
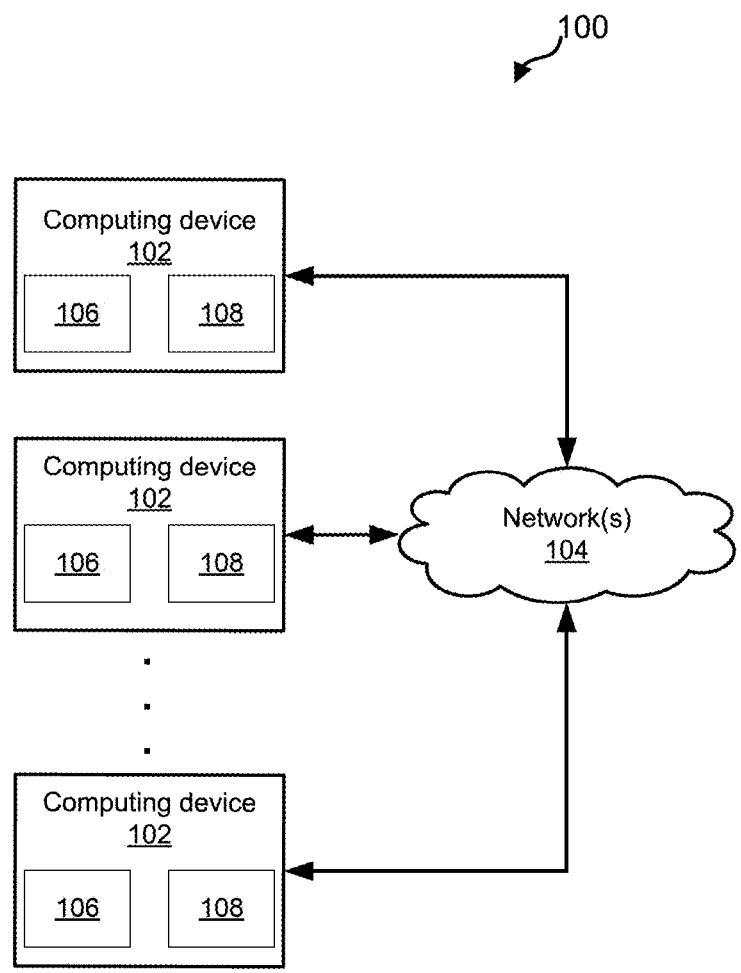
FIG. 1 is a block diagram depicting an example environment in which a network-based video meeting make take place, in accordance with some embodiments.

The subject matter described herein discloses apparatus, systems, techniques, and articles for selecting one out of a plurality of participants in a network-based video meeting. FIG. 1 is a block diagram depicting an example environment 100 in which a network-based video meeting may take place. The example environment 100 includes a plurality of computing devices 102 and a network 104. The network 104 may comprise one or more of a Local Area Network (LAN), Wireless Local Area Network (WLAN), Campus Area Network (CAN), Metropolitan Area Network (MAN), Wide Area Network (WAN) such as the Internet, System-Area Network (SAN), Passive Optical Local Area Network (PO-LAN), Enterprise Private Network (EPN), Virtual Private Network (VPN), or other. The computing devices 102 may comprise one or more of a personal computer, a laptop computer, a notebook computer, a desktop computer, a network computer, a smartphone, a tablet computer, a phablet, or other computing device.

The example computing devices 102 include one or more controllers comprising at least one processor and a non-transitory computer-readable storage device or media encoded with programming instructions for configuring the controller. The processor may be any custom-made or commercially available processor, a central processing unit (CPU), a graphics processing unit (GPU), an application specific integrated circuit (ASIC), a field programmable gate array (FPGA), an auxiliary processor among several processors associated with the controller, a semiconductor-based microprocessor (in the form of a microchip or chip set), any combination thereof, or generally any device for executing instructions.

The non-transitory computer readable storage device or media may include volatile and nonvolatile storage in read-only memory (ROM), random-access memory (RAM), and keep-alive memory (KAM), for example. KAM is a persistent or non-volatile memory that may be used to store various operating variables while the processor is powered down. The computer-readable storage device or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable programming instructions, used by the controller.

The example computing devices 102 include a network communication application 106 for enabling a network-based video meeting between users of the computing devices 102. Example network communication applications include a browser application (e.g., Chrome, Firefox, Safari, and others) that can interact with web-based code (e.g., Google Meet and others) to enable video meetings between more than two participants, and standalone applications (e.g., Zoom and others) that can enable video meetings between more than two participants.

The example computing devices 102 also include a network communication application extension 108 for cooperating with the network communication application 106 to enable the selection of one out of a plurality of participants in a network-based video meeting. Each example computing device 102 includes a controller that executes instructions from the network communication application 106 and the network communication application extension 108 to provide video meetings between more than two participants and enable the selection of one out of the plurality of participants in the network-based video meeting.

A controller in the example computing devices 102 is configured, via instructions from the network communication application 106 and the network communication application extension 108 to receive the actuation of a selectable link provided via the network communication application 106 for facilitating the network-based video meeting; select (e.g., pseudo randomly select) one of the participants responsive to the actuation of the selectable link; link a graphical indicator element with a participant-specific graphical element associated with the selected one of the plurality of participants, and cause the graphical indicator element to be displayed on display devices associated with computing devices for the plurality of participants, wherein when the plurality of participants view a gallery view of the participants, the graphical indicator element identifies the participant-specific graphical element associated with the selected participant.

To cause the graphical indicator element to be displayed on display devices associated with computing devices for the plurality of participants the controller may be configured to share a gallery view screen of the participants for viewing by the other participants that provides a participant-specific graphical element associated with each of the plurality of participants and provide the graphical indicator element on the shared gallery view screen, wherein the shared gallery view screen with the graphical indicator element that identifies the selected participant is provided over a network to each participant. To cause the graphical indicator element to be displayed on display devices associated with computing devices for the plurality of participants the controller may alternatively be configured to provide instructions for use by the computing devices of the other participants to generate and display on its computing device (e.g., on a gallery view screen) the graphical indicator element that identifies the selected participant.

To select one of the participants responsive to the actuation of the selectable link, the controller may be configured to provide a number of preliminary selections for viewing on a gallery view screen prior to providing a final selection for viewing on the gallery view screen. This can add suspense for the participants as they wait for the final selection. To accomplish this, the controller of a computing device 102 may be configured to make a preliminary selection (e.g., pseudorandom selection) of one of the participants responsive to the actuation of the selectable link; provide, on the gallery view screen, a first graphical indicator element that identifies the participant-specific graphical element associated with the participant selected during the preliminary selection; make the preliminary selection and provide the first graphical indicator element for a first number of preliminary cycles; make a final selection (e.g., pseudorandom selection) of one of the participants after completing the first number of preliminary cycles; and provide, on the gallery view screen, a final graphical indicator element that identifies the participant-specific graphical element associated with the participant selected during the final selection.

In another example, a controller in the example computing devices 102 is configured, via instructions from the network communication application 106 and the network communication application extension 108 to share a screen for viewing by other participants in a network-based video meeting that provides a participant-specific graphical element (e.g., an avatar for a participant, data from a video feed from a computing device operated by the participant associated with the participant-specific graphical element, or data from a picture from a computing device operated by the participant associated with the participant-specific graphical element) associated with each of the plurality of participants; receive the actuation of a selectable link provided via the network communication application 106 for facilitating the network-based video meeting; select (e.g., pseudo randomly select) one of the participants responsive to the actuation of the selectable link; and provide, on the shared screen, a graphical indicator element that identifies the participant-specific graphical element associated with the participant selected during the selection. As a result, a shared screen is provided over a network to each participant for viewing the participant-specific graphical elements and the graphical indicator element that identifies the participant-specific graphical element associated with the participant selected during the selection.

To select one of the participants responsive to the actuation of the selectable link, the controller may be configured to provide a number of preliminary selections for viewing on the shared screen prior to providing a final selection for viewing on the shared screen. This can add suspense for the participants as they wait for the final selection. To accomplish this, the controller of a computing device 102 may be configured to make a preliminary selection (e.g., pseudorandom selection) of one of the participants responsive to the actuation of the selectable link; provide, on the shared screen, a first graphical indicator element that identifies the participant-specific graphical element associated with the participant selected during the preliminary selection; make the preliminary selection and provide the first graphical indicator element for a first number of preliminary cycles; make a final selection (e.g., pseudorandom selection) of one of the participants after completing the first number of preliminary cycles; and provide, on the shared screen, a final graphical indicator element that identifies the participant-specific graphical element associated with the participant selected during the final selection.

Figure 2A:
FIGS. 2A, 2B, 2C, 2D, 2E, 2F, and 2G are diagrams of an example computing device that provide illustrations of an example gallery view screen at various states during the selection of one of the participants that may be shared amongst the multiple network meeting participants, in accordance with some embodiments.

FIGS. 2A, 2B, 2C, 2D, 2E, 2F, and 2G are diagrams of an example computing device that provide illustrations of an example gallery view screen at various states during the selection of one of the participants that may be shared amongst the multiple network meeting participants. FIG. 2A illustrates a state 202 of an example gallery view screen after a first participant has been preliminarily selected in a first preliminary cycle of a selection cycle that includes multiple preliminary cycles. In this example, a participant-specific graphical element 204 associated with the participant that has been selected in the first preliminary cycle is identified via a first graphical indicator element 206. In this example, the first graphical indicator element 206 comprises a colored box that surrounds the participant-specific graphical element 204 to highlight the preliminary selection of the participant associated with the participant-specific graphical element 204.

The preliminary selection may be made based on a linear algorithm (e.g., the eighth participant after the last selection) or via a pseudo random algorithm (e.g., based on a pseudo random number selected via a pseudo random number generation algorithm). The number of preliminary cycles may be a fixed number, randomly chosen by the computing device, or pre-selected by a user of the computing device.

Figure 2B:
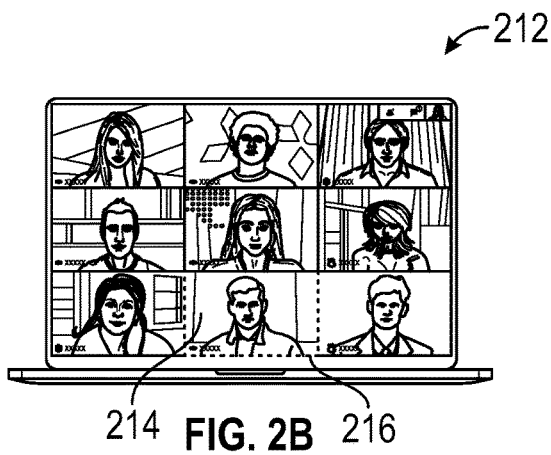

FIG. 2B is a diagram of the example computing device that illustrates a state 212 of the example gallery view screen after a second participant has been preliminarily selected in a second preliminary cycle of the selection cycle. In this example, a participant-specific graphical element 214 associated with the participant that has been selected in the second preliminary cycle is identified via a second graphical indicator element 216. In this example, the second graphical indicator element 216 comprises a colored box that surrounds the participant-specific graphical element 214 to highlight the preliminary selection of the participant associated with the participant-specific graphical element 214.

Figure 2C:
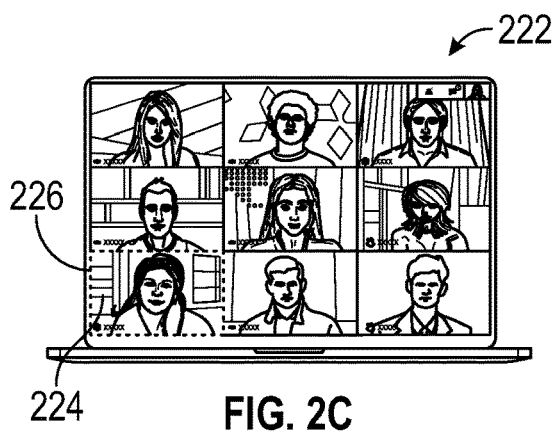

FIG. 2C is a diagram of the example computing device that illustrates a state 222 of the example gallery view screen after a third participant has been preliminarily selected in a third preliminary cycle of the selection cycle. In this example, a participant-specific graphical element 224 associated with the participant that has been selected in the third preliminary cycle is identified via a third graphical indicator element 226. In this example, the third graphical indicator element 226 comprises a colored box that surrounds the participant-specific graphical element 224 to highlight the preliminary selection of the participant associated with the participant-specific graphical element 224.

Figure 2D:

FIG. 2D is a diagram of the example computing device that illustrates a state 232 of the example gallery view screen after a fourth participant has been preliminarily selected in a fourth preliminary cycle of the selection cycle. In this example, a participant-specific graphical element 234 associated with the participant that has been selected in the fourth preliminary cycle is identified via a fourth graphical indicator element 236. In this example, the fourth graphical indicator element 236 comprises a colored box that surrounds the participant-specific graphical element 234 to highlight the preliminary selection of the participant associated with the participant-specific graphical element 234.

Figure 2E:
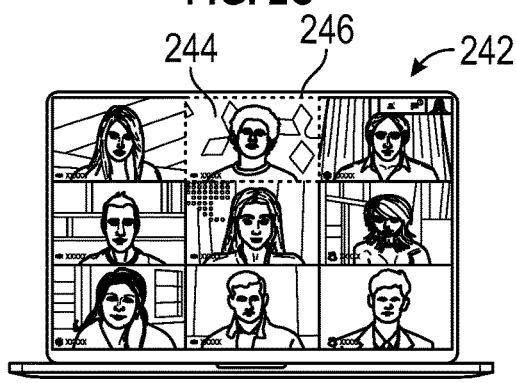

FIG. 2E is a diagram of the example computing device that illustrates a state 242 of the example gallery view screen after a fifth participant has been preliminarily selected in a fifth preliminary cycle of the selection cycle. In this example, a participant-specific graphical element 244 associated with the participant that has been selected in the fifth preliminary cycle is identified via a fifth graphical indicator element 246. In this example, the fifth graphical indicator element 246 comprises a colored box that surrounds the participant-specific graphical element 244 to highlight the preliminary selection of the participant associated with the participant-specific graphical element 244.

Figure 2F:

FIG. 2F is a diagram of the example computing device that illustrates a state 252 of the example gallery view screen after a sixth participant has been finally selected during final selection operations. In this example, a participant-specific graphical element 254 associated with the participant that has been selected during final selection operations is identified via a final graphical indicator element during final selection operations. In this example, the final graphical indicator element comprises a colored box 256 that surrounds the participant-specific graphical element 254, a changed background, foreground, or background and foreground combination pattern, and an icon that is displayed within the participant-specific graphical element 254 to highlight the final selection of the participant associated with the participant-specific graphical element 254. The final selection may be made based on a linear algorithm (e.g., the eighth participant after the last selection) or via a pseudo random algorithm (e.g., based on a pseudo random number selected via a pseudo random number generation algorithm).

Figure 2G:

FIG. 2G is a diagram of the example computing device that illustrates another possible state 262 of the example gallery view screen after a sixth participant has been finally selected during final selection operations. In this example, a participant-specific graphical element 264 associated with the participant that has been selected during final selection operations is identified via a final graphical indicator element during final selection operations. In this example, the final graphical indicator element comprises a colored box 266 that surrounds the participant-specific graphical element 264 and an icon 268 that is displayed within the participant-specific graphical element 264 to highlight the final selection of the participant associated with the participant-specific graphical element 264. The final selection may be made based on a linear algorithm (e.g., the eighth participant after the last selection) or via a pseudo random algorithm (e.g., based on a pseudo random number selected via a pseudo random number generation algorithm).

Figure 3A:
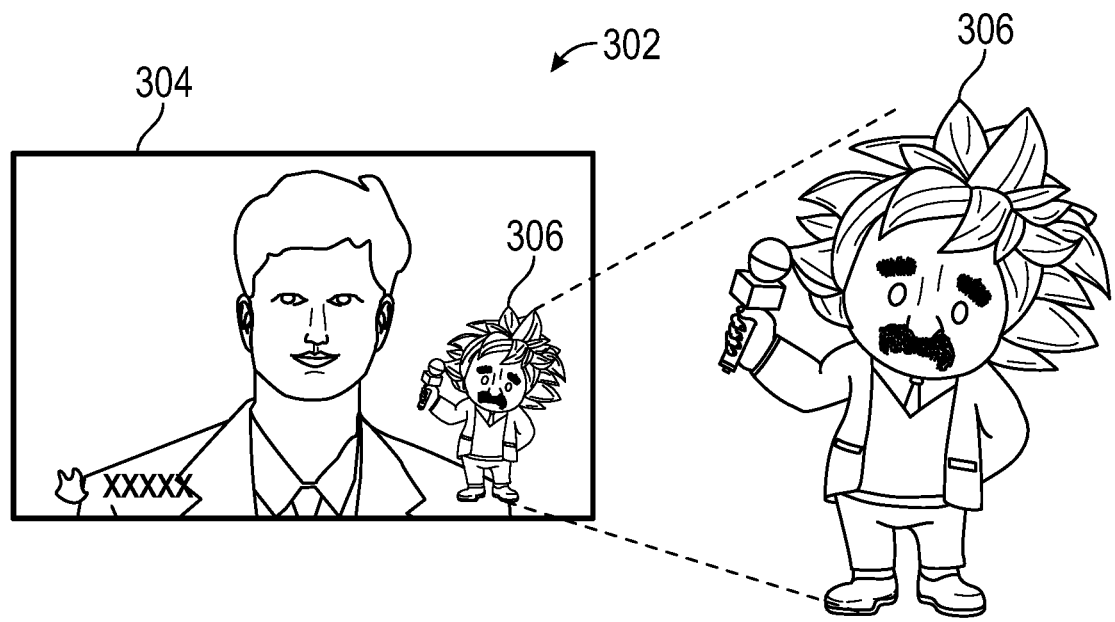
FIGS. 3A and 3B are diagrams of portions of a gallery view screen from an example computing device when a participant-specific graphical element has been selected, in accordance with some embodiments.
Figure 3B:
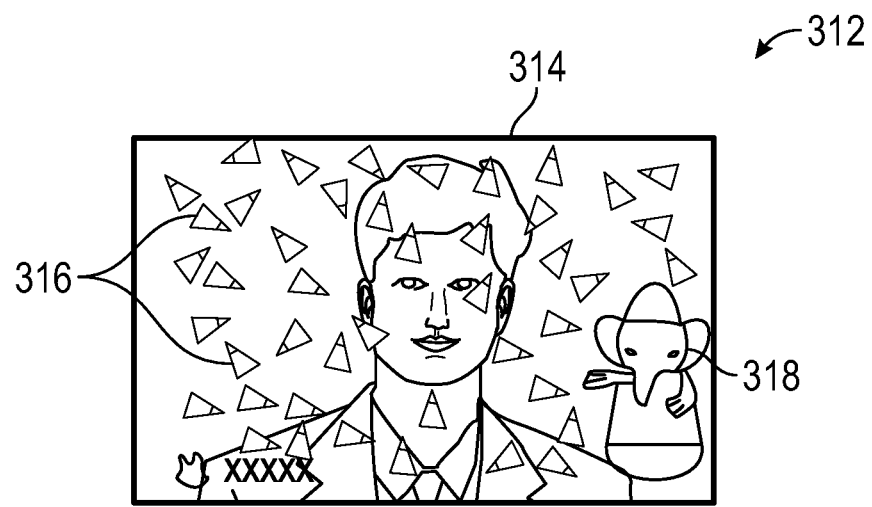

FIGS. 3A and 3B are diagrams of portions of a gallery view screen from an example computing device when a participant-specific graphical element has been selected. FIG. 3A is a diagram depicting a participant-specific graphical element 302, which is associated with the participant that was selected during final selection operations illustrated in FIG. 2G. The participant-specific graphical element 302 has been identified via a final graphical indicator element, which comprises a colored box 304 that surrounds the participant-specific graphical element 302 and an icon 306 that is displayed within the participant-specific graphical element 302 to make the final selection of the participant associated with the participant-specific graphical element 302 stand out.

FIG. 3B is a diagram depicting a participant-specific graphical element 312, which is associated with the participant that was selected during final selection operations illustrated in FIG. 2F. The participant-specific graphical element 312 has been identified via a final graphical indicator element, which comprises a colored box 314 that surrounds the participant-specific graphical element 312, a changed background, foreground, or background and foreground combination pattern 316 (e.g., confetti), and an icon 318 that is displayed within the participant-specific graphical element 312 to make the final selection of the participant associated with the participant-specific graphical element stand out.

Figure 4A:
FIGS. 4A, 4B, and 4C are diagrams of portions of a gallery view screen from an example computing device when a participant-specific graphical element has been selected, in accordance with some embodiments.
Figure 4B:
Figure 4C:

FIGS. 4A, 4B, and 4C are diagrams of portions of a gallery view screen from an example computing device when a participant-specific graphical element has been selected. FIG. 4A is a diagram depicting a participant-specific graphical element 402 that has been identified via a final graphical indicator element that comprises a colored box 404 that surrounds the participant-specific graphical element 402 and an icon 406 that is displayed within the participant-specific graphical element 402 to highlight the final selection of the participant associated with the participant-specific graphical element 402. The icon 406 includes a microphone for indicating that the selected participant has been selected to speak.

FIG. 4B is a diagram depicting a participant-specific graphical element 412 that has been identified via a final graphical indicator element that comprises a colored box 414 that surrounds the participant-specific graphical element 412 and an icon 416 that is displayed within the participant-specific graphical element 412 to highlight the final selection of the participant associated with the participant-specific graphical element 412. The icon 416 includes a first for allowing the participant to first bump the icon 416 acknowledging that the selected participant has been selected.

FIG. 4C is a diagram depicting a participant-specific graphical element 422 that has been identified via a final graphical indicator element that comprises a colored box 424 that surrounds the participant-specific graphical element 422 and an icon 426 that is displayed within the participant-specific graphical element 422 to highlight the final selection of the participant associated with the participant-specific graphical element 422. The icon 426 includes a raised hand for allowing the participant to engage the icon 426 with its raised hand acknowledging that the selected participant has been selected.

Figure 5:
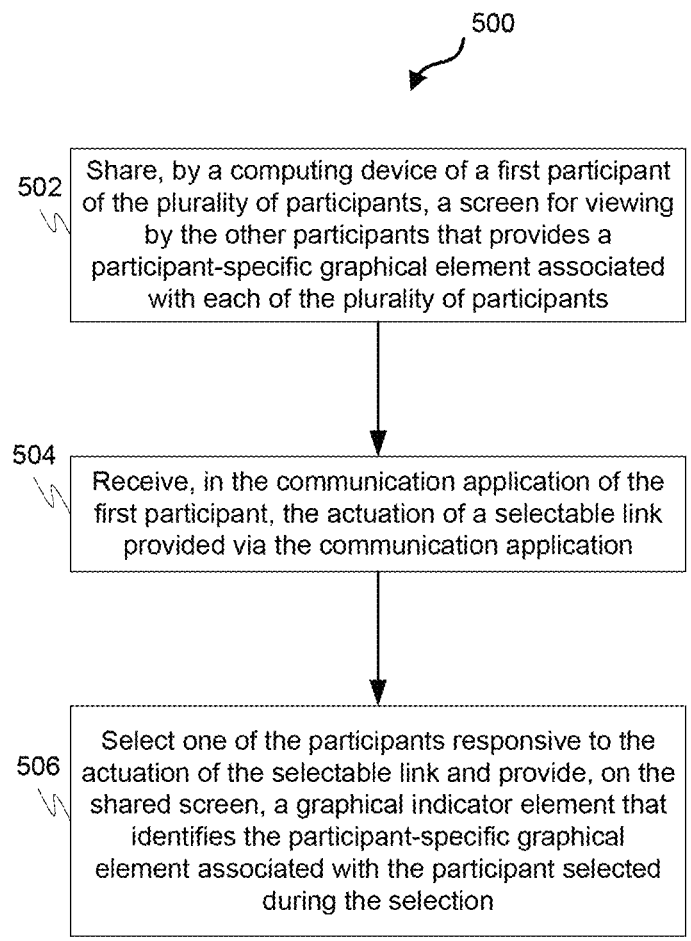
FIG. 5 is a process flow chart depicting an example processor-implemented process for selecting one out of a plurality of participants in a network-based video meeting, in accordance with some embodiments.

FIG. 5 is a process flow chart depicting an example processor-implemented process for selecting one out of a plurality of participants in a network-based video meeting. The order of operation within the example process 500 is not limited to the sequential execution as illustrated in the figure, but may be performed in one or more varying orders as applicable and in accordance with the present disclosure. The example process 500 may be implemented using a web browser application and a web browser plug-in application. The network-based video meeting may be performed using a network communication application. The network communication application may comprise a communication application for communicating via the Internet (e.g., web browser such as Google Chrome, Firefox, Safari, or other application such as Zoom, Microsoft Teams, etc.).

The example process 500 includes sharing, by a computing device of a first participant of the plurality of participants, a screen for viewing by the other participants that provides a participant-specific graphical element associated with each of the plurality of participants (operation 502). The participant-specific graphical elements may comprise one or more of an avatar for a participant, data from a video feed from a computing device operated by the participant associated with the participant-specific graphical element, or data from a picture from a computing device operated by the participant associated with the participant-specific graphical element.

The example process 500 includes receiving, in the communication application of the first participant, the actuation of a selectable link provided via the communication application (operation 504).

The example process 500 includes selecting one of the participants responsive to the actuation of the selectable link and providing, on the shared screen, a graphical indicator element that identifies the participant-specific graphical element associated with the participant selected during the selection (operation 506). The selecting may be accomplished by applying a linear algorithm (e.g., the eighth participant after the last selection) or by applying a pseudo random algorithm (e.g., based on a pseudo random number selected via a pseudo random number generation algorithm).

The selecting and the providing the graphical indicator element may include: making a preliminary selection of one of the participants responsive to the actuation of the selectable link; providing, on the shared screen, a first graphical indicator element that identifies the participant-specific graphical element associated with the participant selected during the preliminary selection; repeating the preliminary selection and providing the first graphical indicator element for a first number of preliminary cycles; making a final selection of one of the participants after completing the first number of preliminary cycles; and providing, on the shared screen, a final graphical indicator element that identifies the participant-specific graphical element associated with the participant selected during the final selection. The preliminary selecting and/or final selecting may be accomplished by applying a linear algorithm (e.g., the eighth participant after the last selection) or by applying a pseudo random algorithm (e.g., based on a pseudo random number selected via a pseudo random number generation algorithm).

The first graphical indicator element may comprise a graphical element that surrounds the participant-specific graphical element associated with the participant selected during a preliminary cycle. The first number of preliminary cycles may be randomly chosen by the computing device. The first number of preliminary cycles may be pre-selected by a user of the computing device. The first number of preliminary cycles may be a fixed number.

The final graphical indicator element may comprise a graphical element that surrounds the participant-specific graphical element associated with the participant selected during the final selection. The final graphical indicator element may further comprise an icon that is displayed within the participant-specific graphical element associated with the participant selected during the final selection. The final graphical indicator element may further comprise a special background, a special foreground, or a special background and foreground combination that is displayed within the participant-specific graphical element associated with the participant selected during the final selection.

These operations result in the shared screen being provided over a network to each participant for viewing the participant-specific graphical elements and the graphical indicator element that identifies the participant-specific graphical element associated with the participant selected during the selection.

Figure 6:
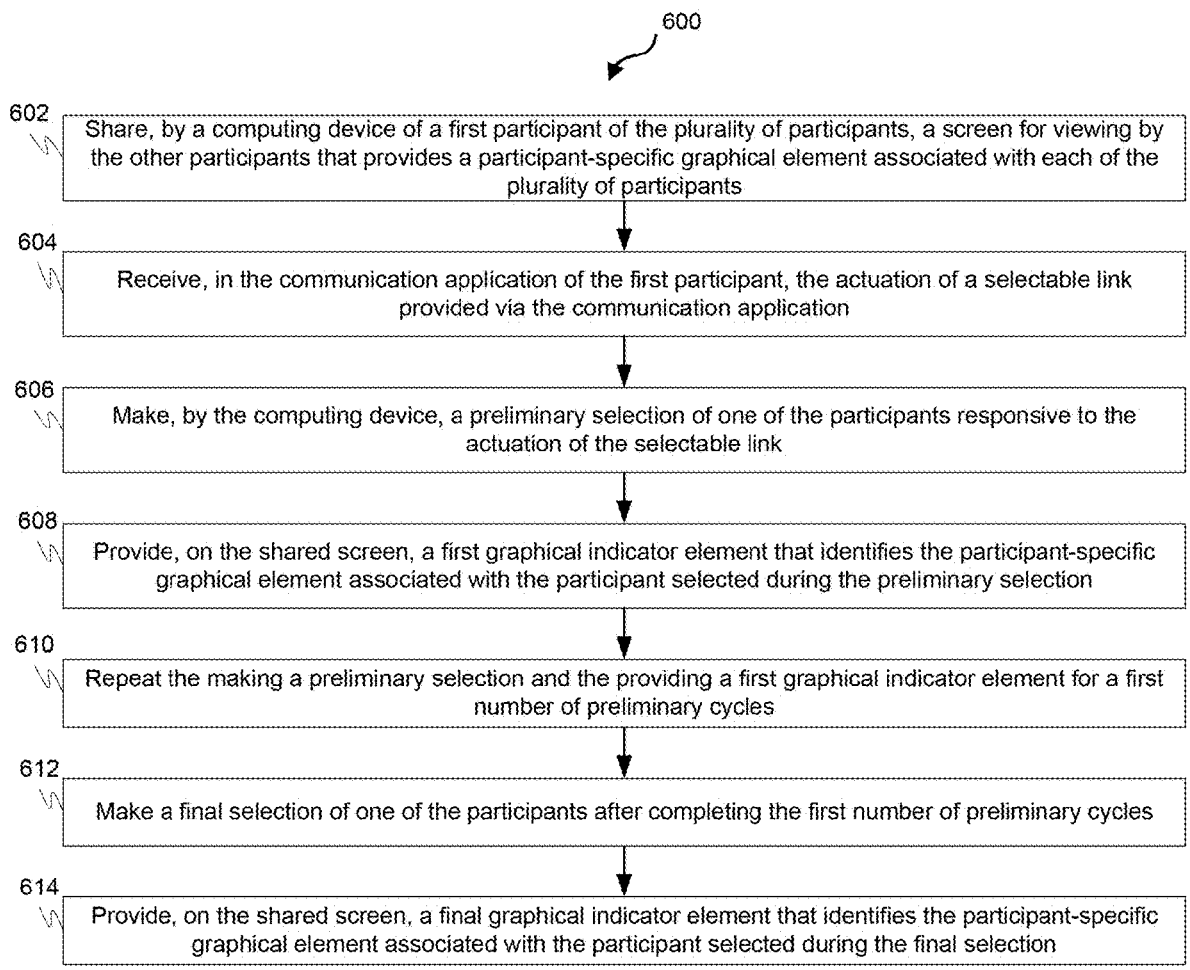
FIG. 6 is a process flow chart depicting an example processor-implemented process, implemented using a network communication application, for selecting one out of a plurality of participants in a network-based video meeting, in accordance with some embodiments.

FIG. 6 is a process flow chart depicting an example processor-implemented process 600, implemented using a network communication application, for selecting one out of a plurality of participants in a network-based video meeting. The order of operation within the example process 600 is not limited to the sequential execution as illustrated in the figure, but may be performed in one or more varying orders as applicable and in accordance with the present disclosure.

The example process 600 includes sharing, by a computing device of a first participant of the plurality of participants, a screen for viewing by the other participants that provides a participant-specific graphical element associated with each of the plurality of participants (operation 602). The participant-specific graphical elements may comprise one or more of an avatar for a participant, data from a video feed from a computing device operated by the participant associated with the participant-specific graphical element, or data from a picture from a computing device operated by the participant associated with the participant-specific graphical element.

The example process 600 includes receiving, in the communication application of the first participant, the actuation of a selectable link provided via the communication application (operation 604).

The example process 600 includes making, by the computing device, a preliminary selection of one of the participants responsive to the actuation of the selectable link (operation 606). The preliminary selecting may be accomplished by applying a linear algorithm (e.g., the eighth participant after the last selection) or by applying a pseudo random algorithm (e.g., based on a pseudo random number selected via a pseudo random number generation algorithm).

The example process 600 includes providing, on the shared screen, a first graphical indicator element that identifies the participant-specific graphical element associated with the participant selected during the preliminary selection (operation 608). The first graphical indicator element may comprise a graphical element that surrounds the participant-specific graphical element associated with the participant selected during a preliminary cycle.

The example process 600 includes repeating the making a preliminary selection and the providing a first graphical indicator element for a first number of preliminary cycles (operation 610). The first number of preliminary cycles may be randomly chosen by the computing device. The first number of preliminary cycles may be pre-selected by a user of the computing device. The first number of preliminary cycles may be a fixed number.

The example process 600 includes making a final selection of one of the participants after completing the first number of preliminary cycles (operation 612). The final selecting may be accomplished by applying a linear algorithm (e.g., the eighth participant after the last selection) or by applying a pseudo random algorithm (e.g., based on a pseudo random number selected via a pseudo random number generation algorithm).

The example process 600 includes providing, on the shared screen, a final graphical indicator element that identifies the participant-specific graphical element associated with the participant selected during the final selection (operation 614). The final graphical indicator element may comprise a graphical element that surrounds the participant-specific graphical element associated with the participant selected during the final selection. The final graphical indicator element may further comprise an icon that is displayed within the participant-specific graphical element associated with the participant selected during the final selection. The final graphical indicator element may further comprise a special background, a special foreground, or a special background and foreground combination that is displayed within the participant-specific graphical element associated with the participant selected during the final selection.

These operations result in the shared screen being provided over a network to each participant for viewing the participant-specific graphical elements, the first graphical indicator element that identifies a selected participant during each preliminary cycle, and final second graphical indicator that identifies the participant-specific graphical element associated with the participant selected during the final selection.

Figure 7:
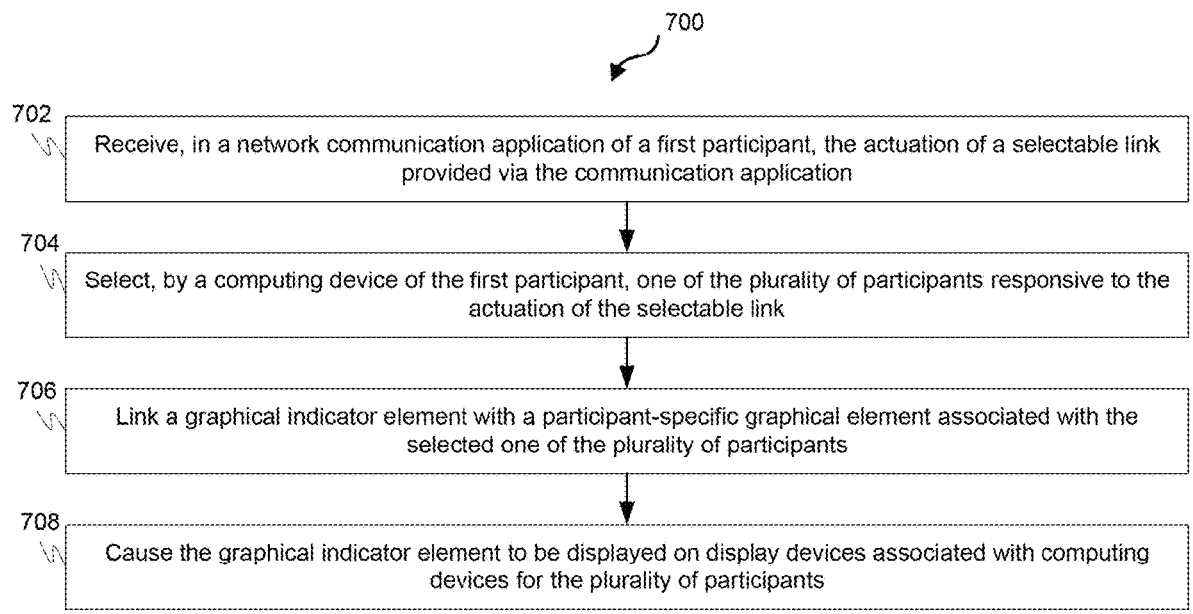
FIG. 7 is a process flow chart depicting another example processor-implemented process, implemented using a network communication application, for selecting one out of a plurality of participants in a network-based video meeting, in accordance with some embodiments.

FIG. 7 is a process flow chart depicting an example processor-implemented process 700, implemented using a network communication application, for selecting one out of a plurality of participants in a network-based video meeting.

The order of operation within the example process 700 is not limited to the sequential execution as illustrated in the figure, but may be performed in one or more varying orders as applicable and in accordance with the present disclosure.

The example process 700 includes receiving, in a network communication application of a first participant, the actuation of a selectable link provided via the communication application (operation 702).

The example process 700 includes selecting, by a computing device of the first participant, one of the plurality of participants responsive to the actuation of the selectable link (operation 704). The selecting may be accomplished by applying a linear algorithm (e.g., the eighth participant after the last selection) or by applying a pseudo random algorithm (e.g., based on a pseudo random number selected via a pseudo random number generation algorithm).

The example process 700 includes linking a graphical indicator element with a participant-specific graphical element associated with the selected one of the plurality of participants (operation 706).

The example process 700 includes causing the graphical indicator element to be displayed on display devices associated with computing devices for the plurality of participants (operation 708). As a result, when the plurality of participants view a gallery view of the participants, the graphical indicator element identifies the participant-specific graphical element associated with the selected participant.

The selecting, linking, and the causing the graphical indicator element to be displayed may include making a preliminary selection of one of the participants responsive to the actuation of the selectable link; linking a first graphical indicator element with a participant-specific graphical element associated with the preliminarily selected one of the plurality of participants; causing the first graphical indicator element to be displayed on display devices associated with computing devices for the plurality of participants; performing the making a preliminary selection, the linking a first graphical indicator element, and the causing the first graphical indicator element to be displayed for a first number of preliminary cycles; making a final selection of one of the participants after completing the first number of preliminary cycles; linking a final graphical indicator element with a participant-specific graphical element associated with the finally selected one of the plurality of participants; and causing the final graphical indicator element to be displayed on display devices associated with computing devices for the plurality of participants.

The causing the graphical indicator element to be displayed on display devices associated with computing devices for the plurality of participants may comprise: sharing, by the computing device of the first participant, a gallery view screen of the participants for viewing by the other participants that provides a participant-specific graphical element associated with each of the plurality of participants; and providing the graphical indicator element on the shared gallery view screen, wherein the shared gallery view screen with the graphical indicator element that identifies the selected participant is provided over a network to each participant.

The selecting, linking, and the causing the graphical indicator element to be displayed may comprise: making a preliminary selection of one of the participants responsive to the actuation of the selectable link; linking a first graphical indicator element with a participant-specific graphical element associated with the preliminarily selected one of the plurality of participants; providing the first graphical indicator element on the shared gallery view screen, wherein the shared gallery view screen with the first graphical indicator element that identifies the preliminarily selected participant is provided over a network to each participant; performing the making a preliminary selection, the linking a first graphical indicator element, and the providing the first graphical indicator element on the shared gallery view screen for a first number of preliminary cycles; making a final selection of one of the participants after completing the first number of preliminary cycles; linking a final graphical indicator element with a participant-specific graphical element associated with the finally selected one of the plurality of participants; and providing the final graphical indicator element on the shared gallery view screen, wherein the shared gallery view screen with the final graphical indicator element that identifies the finally selected participant is provided over a network to each participant.

The subject matter described herein discloses apparatus, systems, techniques, and articles for selecting one out of a plurality of participants in a network-based video meeting. In one embodiment, a processor-implemented method, implemented using a network communication application, is provided for selecting one out of a plurality of participants in a network-based video meeting. The method comprises: sharing, by a computing device of a first participant of the plurality of participants, a screen for viewing by the other participants that provides a participant-specific graphical element associated with each of the plurality of participants; receiving, in the communication application of the first participant, the actuation of a selectable link provided via the communication application; selecting one of the participants responsive to the actuation of the selectable link and providing, on the shared screen, a graphical indicator element that identifies the participant-specific graphical element associated with the participant selected during the selection; wherein the shared screen is provided over a network to each participant for viewing the participant-specific graphical elements and the graphical indicator element that identifies the participant-specific graphical element associated with the participant selected during the selection.

These aspects and other embodiments may include one or more of the following features. The method may be implemented using a web browser application and a web browser plug-in application. The selecting and the providing the graphical indicator element may comprise: making a preliminary selection of one of the participants responsive to the actuation of the selectable link; providing, on the shared screen, a first graphical indicator element that identifies the participant-specific graphical element associated with the participant selected during the preliminary selection; making the preliminary selection and providing the first graphical indicator element for a first number of preliminary cycles; making a final selection of one of the participants after completing the first number of preliminary cycles; and providing, on the shared screen, a final graphical indicator element that identifies the participant-specific graphical element associated with the participant selected during the final selection. The preliminary selecting may be accomplished by applying a linear algorithm (e.g., the eighth participant after the last selection) or by applying a pseudo random algorithm (e.g., based on a pseudo random number selected via a pseudo random number generation algorithm). The final selecting may be accomplished by applying a linear algorithm (e.g., the eighth participant after the last selection) or by applying a pseudo random algorithm (e.g., based on a pseudo random number selected via a pseudo random number generation algorithm). The network communication application may comprise a communication application for communicating via the Internet (e.g., web browser such as Google Chrome, Firefox, Safari, or other application such as Zoom, Microsoft Teams, etc.). The participant-specific graphical elements may comprise one or more of an avatar for a participant, data from a video feed from a computing device operated by the participant associated with the participant-specific graphical element, or data from a picture from a computing device operated by the participant associated with the participant-specific graphical element. The first graphical indicator element may comprise a graphical element that surrounds the participant-specific graphical element associated with the participant selected during a preliminary cycle. The first number of preliminary cycles may be randomly chosen by the computing device, pre-selected by a user of the computing device, or a fixed number. The final graphical indicator element may comprise a graphical element that surrounds the participant-specific graphical element associated with the participant selected during the final selection. The final graphical indicator element further may comprise an icon that is caused to be displayed within the participant-specific graphical element associated with the participant selected during the final selection. The final graphical indicator element further may comprise a special background, a special foreground, or a special background and foreground combination that is caused to be displayed within the participant-specific graphical element associated with the participant selected during the final selection.

In another embodiment, a processor-implemented method, implemented using a network communication application, is provided for selecting one out of a plurality of participants in a network-based video meeting. The method comprises: sharing, by a computing device of a first participant of the plurality of participants, a screen for viewing by the other participants that provides a participant-specific graphical element associated with each of the plurality of participants; receiving, in the communication application of the first participant, the actuation of a selectable link provided via the communication application; making, by the computing device, a preliminary selection of one of the participants responsive to the actuation of the selectable link; providing, on the shared screen, a first graphical indicator element that identifies the participant-specific graphical element associated with the participant selected during the preliminary selection; repeating the making a preliminary selection and the providing a first graphical indicator element for a first number of preliminary cycles; making a final selection of one of the participants after completing the first number of preliminary cycles; and providing, on the shared screen, a final graphical indicator element that identifies the participant-specific graphical element associated with the participant selected during the final selection; wherein the shared screen is provided over a network to each participant for viewing the participant-specific graphical elements, the first graphical indicator element that identifies a selected participant during each preliminary cycle, and final second graphical indicator that identifies the participant-specific graphical element associated with the participant selected during the final selection.

These aspects and other embodiments may include one or more of the following features. The method may be implemented using a web browser application and a web browser plug-in application. The preliminary selecting may be accomplished by applying a linear algorithm (e.g., the eighth participant after the last selection) or by applying a pseudo random algorithm (e.g., based on a pseudo random number selected via a pseudo random number generation algorithm). The final selecting may be accomplished by applying a linear algorithm (e.g., the eighth participant after the last selection) or by applying a pseudo random algorithm (e.g., based on a pseudo random number selected via a pseudo random number generation algorithm). The network communication application may comprise a communication application for communicating via the Internet (e.g., web browser such as Google Chrome, Firefox, Safari, or other application such as Zoom, Microsoft Teams, etc.). The participant-specific graphical elements may comprise one or more of an avatar for a participant, data from a video feed from a computing device operated by the participant associated with the participant-specific graphical element, or data from a picture from a computing device operated by the participant associated with the participant-specific graphical element. The first graphical indicator element may comprise a graphical element that surrounds the participant-specific graphical element associated with the participant selected during a preliminary cycle. The first number of preliminary cycles may be randomly chosen by the computing device, pre-selected by a user of the computing device, or a fixed number. The final graphical indicator element may comprise a graphical element that surrounds the participant-specific graphical element associated with the participant selected during the final selection. The final graphical indicator element further may comprise an icon that is caused to be displayed within the participant-specific graphical element associated with the participant selected during the final selection. The final graphical indicator element further may comprise a special background, a special foreground, or a special background and foreground combination that is caused to be displayed within the participant-specific graphical element associated with the participant selected during the final selection.

In another embodiment, a processor-implemented system configured for use by a first participant of a plurality of participants in a network-based video meeting and for selecting one of the plurality of participants is provided. The system comprises a controller configured by programming instructions on non-transitory computer readable media to: share a screen for viewing by the other participants that provides a participant-specific graphical element associated with each of the plurality of participants; receive the actuation of a selectable link provided via a communication application for facilitating the network-based video meeting; and select one of the participants responsive to the actuation of the selectable link and provide, on the shared screen, a graphical indicator element that identifies the participant-specific graphical element associated with the participant selected during the selection; wherein the shared screen is provided over a network to each participant for viewing the participant-specific graphical elements and the graphical indicator element that identifies the participant-specific graphical element associated with the participant selected during the selection.

These aspects and other embodiments may include one or more of the following features. The system may be implemented using a web browser application and a web browser plug-in application. To select and provide the graphical indicator element the controller may be further configured to: make a preliminary selection of one of the participants responsive to the actuation of the selectable link; provide, on the shared screen, a first graphical indicator element that identifies the participant-specific graphical element associated with the participant selected during the preliminary selection; make the preliminary selection and provide the first graphical indicator element for a first number of preliminary cycles; make a final selection of one of the participants after completing the first number of preliminary cycles; and provide, on the shared screen, a final graphical indicator element that identifies the participant-specific graphical element associated with the participant selected during the final selection. The preliminary selecting may be accomplished by applying a linear algorithm (e.g., the eighth participant after the last selection) or by applying a pseudo random algorithm (e.g., based on a pseudo random number selected via a pseudo random number generation algorithm). The final selecting may be accomplished by applying a linear algorithm (e.g., the eighth participant after the last selection) or by applying a pseudo random algorithm (e.g., based on a pseudo random number selected via a pseudo random number generation algorithm). The network-based video meeting may comprise an Internet-based video meeting. The participant-specific graphical elements may comprise one or more of an avatar for a participant, data from a video feed from a computing device operated by the participant associated with the participant-specific graphical element, or data from a picture from a computing device operated by the participant associated with the participant-specific graphical element. The first graphical indicator element may comprise a graphical element that surrounds the participant-specific graphical element associated with the participant selected during a preliminary cycle. The first number of preliminary cycles may be randomly chosen by the computing device, pre-selected by a user of the computing device, or a fixed number. The final graphical indicator element may comprise a graphical element that surrounds the participant-specific graphical element associated with the participant selected during the final selection. The final graphical indicator element further may comprise an icon that is caused to be displayed within the participant-specific graphical element associated with the participant selected during the final selection. The final graphical indicator element further may comprise a special background, a special foreground, or a special background and foreground combination that is caused to be displayed within the participant-specific graphical element associated with the participant selected during the final selection.

In another embodiment, non-transitory computer readable media encoded with programming instructions configurable to cause a computing device of a first participant of a plurality of participants to a network-based video meeting to perform a method is provided. The method comprises: sharing a screen for viewing by the other participants that provides a participant-specific graphical element associated with each of the plurality of participants; receiving the actuation of a selectable link provided via a communication application for facilitating the network-based video meeting; selecting one of the participants responsive to the actuation of the selectable link and providing, on the shared screen, a graphical indicator element that identifies the participant-specific graphical element associated with the participant selected during the selection; wherein the shared screen is provided over a network to each participant for viewing the participant-specific graphical elements and the graphical indicator element that identifies the participant-specific graphical element associated with the participant selected during the selection.

These aspects and other embodiments may include one or more of the following features. The method may be implemented using a web browser application and a web browser plug-in application. The selecting and the providing the graphical indicator element may comprise: making a preliminary selection of one of the participants responsive to the actuation of the selectable link; providing, on the shared screen, a first graphical indicator element that identifies the participant-specific graphical element associated with the participant selected during the preliminary selection; making the preliminary selection and providing the first graphical indicator element for a first number of preliminary cycles; making a final selection of one of the participants after completing the first number of preliminary cycles; and providing, on the shared screen, a final graphical indicator element that identifies the participant-specific graphical element associated with the participant selected during the final selection. The preliminary selecting may be accomplished by applying a linear algorithm (e.g., the eighth participant after the last selection) or by applying a pseudo random algorithm (e.g., based on a pseudo random number selected via a pseudo random number generation algorithm). The final selecting may be accomplished by applying a linear algorithm (e.g., the eighth participant after the last selection) or by applying a pseudo random algorithm (e.g., based on a pseudo random number selected via a pseudo random number generation algorithm). The network communication application may comprise a communication application for communicating via the Internet (e.g., web browser such as Google Chrome, Firefox, Safari, or other application such as Zoom, Microsoft Teams, etc.). The participant-specific graphical elements may comprise one or more of an avatar for a participant, data from a video feed from a computing device operated by the participant associated with the participant-specific graphical element, or data from a picture from a computing device operated by the participant associated with the participant-specific graphical element. The first graphical indicator element may comprise a graphical element that surrounds the participant-specific graphical element associated with the participant selected during a preliminary cycle. The first number of preliminary cycles may be randomly chosen by the computing device, pre-selected by a user of the computing device, or a fixed number. The final graphical indicator element may comprise a graphical element that surrounds the participant-specific graphical element associated with the participant selected during the final selection. The final graphical indicator element further may comprise an icon that is caused to be displayed within the participant-specific graphical element associated with the participant selected during the final selection. The final graphical indicator element further may comprise a special background, a special foreground, or a special background and foreground combination that is caused to be displayed within the participant-specific graphical element associated with the participant selected during the final selection.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems)

may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A processor-implemented method, implemented using a network communication application, for selecting one out of a plurality of participants in a network-based video meeting, the method comprising:
   receiving, in a network communication application of a first participant, actuation of a selectable link provided via the network communication application;
   selecting, by a computing device of the first participant of the plurality of participants without prior indication of a selection of a participant, any one of the plurality of participants responsive to the actuation of the selectable link;
   linking a graphical indicator element with a participant-specific graphical element associated with the selected one of the plurality of participants; and
   causing the graphical indicator element to be displayed on display devices associated with computing devices for the plurality of participants;
   wherein when the plurality of participants view a gallery view of the participants, the graphical indicator element identifies the participant-specific graphical element associated with the selected participant.

2. The method of claim 1, wherein the selecting, linking, and the causing the graphical indicator element to be displayed comprises:
   choosing a preliminarily selected one of the participants responsive to the actuation of the selectable link;
   linking a first graphical indicator element with a participant-specific graphical element associated with the preliminarily selected one of the plurality of participants;
   causing the first graphical indicator element to be displayed on display devices associated with computing devices for the plurality of participants;
   performing the choosing a preliminarily selected one, the linking a first graphical indicator element, and the causing the first graphical indicator element to be displayed for a first number of preliminary cycles;
   choosing a finally selected one of the participants after completing the first number of preliminary cycles;
   linking a final graphical indicator element with a participant-specific graphical element associated with the finally selected one of the plurality of participants; and
   causing the final graphical indicator element to be displayed on display devices associated with computing devices for the plurality of participants.

3. The method of claim 1, wherein the causing the graphical indicator element to be displayed on display devices associated with computing devices for the plurality of participants comprises:
  sharing, by the computing device of the first participant, a gallery view screen of the participants for viewing by other participants that provides a participant-specific graphical element associated with each of the plurality of participants; and
  providing the graphical indicator element on the shared gallery view screen, wherein the shared gallery view screen with the graphical indicator element that identifies the selected participant is provided over a network to each participant.

4. The method of claim 3, wherein the selecting, linking, and the causing the graphical indicator element to be displayed comprises:
  choosing a preliminarily selected one of the participants responsive to the actuation of the selectable link;
  linking a first graphical indicator element with a participant-specific graphical element associated with the preliminarily selected one of the plurality of participants;
  providing the first graphical indicator element on the shared gallery view screen, wherein the shared gallery view screen with the first graphical indicator element that identifies the preliminarily selected participant is provided over a network to each participant;
  performing the choosing a preliminarily selected one, the linking a first graphical indicator element, and the providing the first graphical indicator element on the shared gallery view screen for a first number of preliminary cycles;
  choosing a finally selected one of the participants after completing the first number of preliminary cycles;
  linking a final graphical indicator element with a participant-specific graphical element associated with the finally selected one of the plurality of participants; and
  providing the final graphical indicator element on the shared gallery view screen, wherein the shared gallery view screen with the final graphical indicator element that identifies the finally selected participant is provided over a network to each participant.

5. The method of claim 1, wherein the participant-specific graphical element comprises one or more of an avatar for a participant, data from a video feed from a computing device operated by the participant associated with the participant-specific graphical element, or data from a picture from a computing device operated by the participant associated with the participant-specific graphical element.

6. The method of claim 2, wherein the first graphical indicator element comprises a graphical element that surrounds the participant-specific graphical element associated with the participant selected during a preliminary cycle.

7. The method of claim 2, wherein the first number of preliminary cycles is randomly chosen by the computing device or pre-selected by a user of the computing device.

8. The method of claim 2, wherein the first number of preliminary cycles is a fixed number.

9. The method of claim 2, wherein the final graphical indicator element comprises a graphical element that surrounds the participant-specific graphical element associated with the participant selected during the final selection.

10. The method of claim 9, wherein the final graphical indicator element further comprises an icon that is caused to be displayed within the participant-specific graphical element associated with the participant selected during the final selection.

11. The method of claim 10, wherein the final graphical indicator element further comprises a special background, a special foreground, or a special background and foreground combination that is caused to be displayed within the participant-specific graphical element associated with the participant selected during the final selection.

12. The method of claim 1, wherein the selecting comprises selecting using random or a pseudo random algorithm.

13. A processor-implemented system configured for use by a first participant of a plurality of participants in a network-based video meeting and for selecting one of the plurality of participants, the system comprising a controller configured by programming instructions on non-transitory computer readable media to:
  receive actuation of a selectable link provided via a network communication application;
  select, without prior indication of a selection of a participant, any one of the plurality of participants responsive to the actuation of the selectable link;
  link a graphical indicator element with a participant-specific graphical element associated with the selected one of the plurality of participants; and
  cause the graphical indicator element to be displayed on display devices associated with computing devices for the plurality of participants;
  wherein when the plurality of participants view a gallery view of the participants, the graphical indicator element identifies the participant-specific graphical element associated with the selected participant.

14. The system of claim 13, wherein to select, link, and cause the graphical indicator element to be displayed the controller is configured to:
  choose a preliminarily selected one of the participants responsive to the actuation of the selectable link;
  link a first graphical indicator element with a participant-specific graphical element associated with the preliminarily selected one of the plurality of participants;
  cause the first graphical indicator element to be displayed on display devices associated with computing devices for the plurality of participants;
  perform operations to choose a preliminarily selected one, link a first graphical indicator element, and cause the first graphical indicator element to be displayed for a first number of preliminary cycles;
  choose a finally selected one of the participants after completing the first number of preliminary cycles;
  link a final graphical indicator element with a participant-specific graphical element associated with the finally selected one of the plurality of participants; and
  cause the final graphical indicator element to be displayed on display devices associated with computing devices for the plurality of participants.

15. The system of claim 13, wherein to cause the graphical indicator element to be displayed on display devices associated with computing devices for the plurality of participants the controller is configured to:
  share a gallery view screen of the participants for viewing by the other participants that provides a participant-specific graphical element associated with each of the plurality of participants; and
  provide the graphical indicator element on the shared gallery view screen, wherein the shared gallery view screen with the graphical indicator element that identifies the selected participant is provided over a network to each participant.

16. The system of claim 15, wherein to select, link, and cause the graphical indicator element to be displayed the controller is configured to:
choose a preliminarily selected one of the participants responsive to the actuation of the selectable link;
link a first graphical indicator element with a participant-specific graphical element associated with the preliminarily selected one of the plurality of participants;
provide the first graphical indicator element on the shared gallery view screen, wherein the shared gallery view screen with the first graphical indicator element that identifies the preliminarily selected participant is provided over a network to each participant;
perform operations to choose a preliminarily selected one, link a first graphical indicator element, and provide the first graphical indicator element on the shared gallery view screen for a first number of preliminary cycles;
choose a finally selected one of the participants after completing the first number of preliminary cycles;
link a final graphical indicator element with a participant-specific graphical element associated with the finally selected one of the plurality of participants; and
provide the final graphical indicator element on the shared gallery view screen, wherein the shared gallery view screen with the final graphical indicator element that identifies the finally selected participant is provided over a network to each participant.

17. Non-transitory computer readable media encoded with programming instructions configurable to cause a computing device of a first participant of a plurality of participants to a network-based video meeting to perform a method comprising:
receiving, in a network communication application of a first participant, actuation of a selectable link provided via the network communication application;
selecting, without prior indication of a selection of a participant, any one of the plurality of participants responsive to the actuation of the selectable link;
linking a graphical indicator element with a participant-specific graphical element associated with the selected one of the plurality of participants; and
causing the graphical indicator element to be displayed on display devices associated with computing devices for the plurality of participants;
wherein when the plurality of participants view a gallery view of the participants, the graphical indicator element identifies the participant-specific graphical element associated with the selected participant.

18. The non-transitory computer readable media of claim 17, wherein the selecting, linking, and the causing the graphical indicator element to be displayed comprises:
choosing a preliminarily selected one of the participants responsive to the actuation of the selectable link;
linking a first graphical indicator element with a participant-specific graphical element associated with the preliminarily selected one of the plurality of participants;
causing the first graphical indicator element to be displayed on display devices associated with computing devices for the plurality of participants;
performing the choosing a preliminarily selected one, the linking a first graphical indicator element, and the causing the first graphical indicator element to be displayed for a first number of preliminary cycles;
choosing a finally selected one of the participants after completing the first number of preliminary cycles;
linking a final graphical indicator element with a participant-specific graphical element associated with the finally selected one of the plurality of participants; and
causing the final graphical indicator element to be displayed on display devices associated with computing devices for the plurality of participants.

19. The non-transitory computer readable media of claim 17, wherein the causing the graphical indicator element to be displayed on display devices associated with computing devices for the plurality of participants comprises:
sharing a gallery view screen of the participants for viewing by the other participants that provides a participant-specific graphical element associated with each of the plurality of participants; and
providing the graphical indicator element on the shared gallery view screen, wherein the shared gallery view screen with the graphical indicator element that identifies the selected participant is provided over a network to each participant.

20. The non-transitory computer readable media of claim 19, wherein the selecting, linking, and the causing the graphical indicator element to be displayed comprises:
choosing a preliminarily selected one of the participants responsive to the actuation of the selectable link;
linking a first graphical indicator element with a participant-specific graphical element associated with the preliminarily selected one of the plurality of participants;
providing the first graphical indicator element on the shared gallery view screen, wherein the shared gallery view screen with the first graphical indicator element that identifies the preliminarily selected participant is provided over a network to each participant;
performing the choosing a preliminarily selected one, the linking a first graphical indicator element, and the providing the first graphical indicator element on the shared gallery view screen for a first number of preliminary cycles;
choosing a finally selected one of the participants after completing the first number of preliminary cycles;
linking a final graphical indicator element with a participant-specific graphical element associated with the finally selected one of the plurality of participants; and
providing the final graphical indicator element on the shared gallery view screen, wherein the shared gallery view screen with the final graphical indicator element that identifies the finally selected participant is provided over a network to each participant.

* * * * *